US00RE45331E

(19) United States
(12) Reissued Patent
Webre et al.

(10) Patent Number: US RE45,331 E
(45) Date of Reissued Patent: Jan. 13, 2015

(54) TOP FEED OF CONTROL LINES TO TABLE-ELEVATED SPIDER

(75) Inventors: Charles Michael Webre, Lafayette, LA (US); Brian David Begnaud, Lafayette, LA (US); Vernon Joseph Bouligny, New Iberia, LA (US)

(73) Assignee: Frank's International, LLC, Houston, TX (US)

(21) Appl. No.: 12/775,328

(22) Filed: May 6, 2010

Related U.S. Patent Documents

Reissue of:
(64) Patent No.: 7,367,403
Issued: May 6, 2008
Appl. No.: 11/328,208
Filed: Jan. 9, 2006

U.S. Applications:
(63) Continuation-in-part of application No. 10/995,905, filed on Nov. 24, 2004, now Pat. No. 7,222,677, which is a continuation-in-part of application No. 10/315,617, filed on Dec. 10, 2002, now Pat. No. 6,920,931, said application No. 11/328,208 is a continuation-in-part of application No. 10/995,907, filed on Nov. 24, 2004, now Pat. No. 7,216,716, which is a continuation-in-part of application No. 10/315,617.

(51) Int. Cl.
*E21B 19/00* (2006.01)

(52) U.S. Cl.
USPC ..... 166/379; 166/77.1

(58) Field of Classification Search
USPC ..... 166/379, 380, 77.1, 77.4, 77.51, 77.52
See application file for complete search history.

(56) References Cited

U.S. PATENT DOCUMENTS

| | | | |
|---|---|---|---|
| 296,171 | A | 4/1884 | Hocking et al. |
| 3,441,084 | A | 4/1969 | Fredd |
| 3,448,803 | A | 6/1969 | Sizer |
| 3,654,995 | A | 4/1972 | Sizer |
| 3,722,584 | A | 3/1973 | Nelson |
| 3,722,603 | A | 3/1973 | Brown |
| 3,742,563 | A | 7/1973 | Brown |

(Continued)

FOREIGN PATENT DOCUMENTS

| | | |
|---|---|---|
| WO | WO 00/19061 | 4/2000 |
| WO | 2005003504 | 1/2005 |

(Continued)

OTHER PUBLICATIONS

Extended European Search Report in Application No. 10193164.0-2315, dated Mar. 2, 2011 (5 pages).

(Continued)

*Primary Examiner* — Jennifer H Gay
(74) *Attorney, Agent, or Firm* — Osha Liang LLP

(57) ABSTRACT

A method and apparatus are provided for installing control lines and pipe into a well. The pipe-holding spider that is normally mounted on the rig floor is supported by a table elevated above the rig floor. Supporting the spider on an elevated table provides personnel with access to a portion of the length of the pipe string below the elevated spider and above the rig floor for applying a fastener to secure the control line to the pipe string. The control line is supplied from above the spider and is positioned by a control line guide supported on the spider or a sleeve to pass through the spider outside the path of the pipe gripping members, such as slips.

40 Claims, 7 Drawing Sheets

(56) References Cited

U.S. PATENT DOCUMENTS

| | | | | |
|---|---|---|---|---|
| 4,106,575 | A | 8/1978 | Bunnelle | |
| 4,274,778 | A | 6/1981 | Putnam et al. | |
| 4,281,716 | A | 8/1981 | Hall | |
| 4,450,606 | A | 5/1984 | Broussard | |
| 4,523,645 | A * | 6/1985 | Moore | 166/385 |
| 4,715,625 | A | 12/1987 | Shows et al. | |
| 4,938,109 | A | 7/1990 | Torres et al. | |
| 5,335,756 | A | 8/1994 | Penisson | |
| 5,503,234 | A | 4/1996 | Clanton | |
| 5,732,909 | A | 3/1998 | Sonnier | |
| 6,089,338 | A | 7/2000 | Bouligny, Jr. | |
| 6,131,664 | A | 10/2000 | Sonnier | 166/381 |
| 6,138,776 | A | 10/2000 | Hart et al. | |
| 6,279,662 | B1 | 8/2001 | Sonnier | |
| 6,443,241 | B1 | 9/2002 | Juhasz et al. | |
| 6,471,439 | B2 | 10/2002 | Allamon et al. | |
| 6,637,526 | B2 | 10/2003 | Juhasz et al. | |
| 6,889,772 | B2 | 5/2005 | Buytaert | 166/381 |
| 6,920,931 | B1 | 7/2005 | Webre et al. | 166/379 |
| 7,201,233 | B2 * | 4/2007 | Penisson et al. | 166/384 |
| 7,216,716 | B2 * | 5/2007 | Cole et al. | 166/379 |
| 7,222,677 | B2 * | 5/2007 | Webre et al. | 166/379 |
| 7,249,637 | B2 * | 7/2007 | Hayes et al. | 166/385 |
| 7,337,853 | B2 * | 3/2008 | Buytaert et al. | 166/381 |
| 7,367,403 | B2 * | 5/2008 | Webre et al. | 166/379 |
| 7,610,965 | B2 * | 11/2009 | Pennison et al. | 166/380 |
| 7,631,696 | B2 | 12/2009 | Heller et al. | |
| 7,681,631 | B2 * | 3/2010 | Thomas et al. | 166/77.1 |
| 7,703,540 | B2 * | 4/2010 | Webre et al. | 166/379 |
| 7,717,184 | B2 * | 5/2010 | Vold et al. | 166/385 |
| 7,740,078 | B2 * | 6/2010 | Hayes et al. | 166/385 |
| 7,779,902 | B2 * | 8/2010 | Coyle, Jr. | 166/77.2 |
| 7,918,282 | B2 | 4/2011 | Heller et al. | |
| 2004/0079533 | A1 * | 4/2004 | Buytaert et al. | 166/380 |
| 2005/0161225 | A1 * | 7/2005 | Cole et al. | 166/379 |
| 2005/0161227 | A1 | 7/2005 | Hayes et al. | 166/380 |
| 2006/0065404 | A1 * | 3/2006 | Pennison et al. | 166/380 |
| 2006/0065407 | A1 * | 3/2006 | Rufey | 166/384 |
| 2006/0090901 | A1 * | 5/2006 | Pennison et al. | 166/379 |
| 2006/0108122 | A1 * | 5/2006 | Buytaert et al. | 166/379 |
| 2006/0137884 | A1 * | 6/2006 | Torres | 166/380 |
| 2007/0158065 | A1 | 7/2007 | Heller et al. | |
| 2007/0158079 | A1 * | 7/2007 | Webre et al. | 166/380 |
| 2007/0209804 | A1 * | 9/2007 | Webre et al. | 166/379 |
| 2008/0006400 | A1 * | 1/2008 | Coyle | 166/77.1 |
| 2008/0023192 | A1 * | 1/2008 | Hayes et al. | 166/77.1 |
| 2008/0308281 | A1 * | 12/2008 | Boutwell et al. | 166/385 |
| 2010/0038094 | A9 * | 2/2010 | Webre et al. | 166/379 |
| 2010/0059231 | A1 * | 3/2010 | Thomas et al. | 166/380 |
| 2010/0175893 | A1 * | 7/2010 | Webre et al. | 166/381 |
| 2011/0284226 | A1 | 11/2011 | Smith | |

FOREIGN PATENT DOCUMENTS

| | | |
|---|---|---|
| WO | 2005003504 A2 | 1/2005 |
| WO | 2005028808 | 3/2005 |
| WO | 2005028808 A1 | 3/2005 |

OTHER PUBLICATIONS

Office Action in Australian Patent Application No. 2007204941, dated Apr. 4, 2011 (2 pages).

Office Action received in corresponding U.S. Appl. No. 13/434,482, dated Aug. 24, 2012, 10 pages.

PCT International Search Report, Jun. 6, 2007 5 pages.

International Search Report; International application No. PCT/US03/33647; International filing date Oct. 23, 2003; 4 pages.

* cited by examiner

TOP FEED OF CONTROL LINES TO TABLE-ELEVATED SPIDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a continuation in part of U.S. patent application Ser. No. 10/995,905, filed on Nov. 24, 2004, now having issued as U.S. Pat. No. 7,222,677 on May 29, 2007, which is a continuation in part of U.S. patent application Ser. No. 10/315,617, filed on Dec. 10, 2002, now having issued as U.S. Pat. No. 6,920,931 on Jul. 26, 2005. The present application is also a continuation in part of U.S. patent application Ser. No. 10/995,907, filed on Nov. 24, 2004, now having issued as U.S. Pat. No. 7,216,716 on May 15, 2007, which is also a continuation in part of U.S. patent application Ser. No. 10/315,617, filed on Dec. 10, 2002, now having issued as U.S. Pat. No. 6,920,931 on Jul. 26, 2005.*

BACKGROUND OF THE INVENTION

1. Field of the Invention

The present invention relates to a method and apparatus for installing pipe and a control line in a well. More specifically, the present invention relates to a method and apparatus for securing a control line to a string of pipe as the pipe is being made up and run into a well.

2. Background of the Related Art

Wells are generally drilled deep into the earth's crust to establish fluid communication between the surface and subsurface geologic formations containing naturally occurring hydrocarbon deposits, such as oil or gas. A well provides a fluid conduit allowing sub surface deposits of oil and gas to be produced at the surface. It is common for a drilled borehole to penetrate a plurality of formations. Formations may contain hydrocarbons or other fluids of different compositions and at different pressures than the hydrocarbons and fluids contained in other formations. Formations may also contain water (aquifers), brine, hydrogen sulfide gas and other materials that may be undesirable.

A drilled borehole is completed into a well by circulating cement into the annulus between the wall of the drilled borehole and the outer surface of a pipe string called casing to form a cement liner. The cement hardens to isolate penetrated formations from flowing into the well and to the surface. Once a borehole is drilled and completed, decisions are made as to which of the penetrated formations to selectively produce. A perforating tool is used to cut a hole through the casing and the cement liner to selectively establish fluid communication between the targeted formation and the surface. Once a formation is perforated, the well may be produced to (pressure) depletion, until it "waters out" by increasing water content, or both. Once a formation is depleted or watered-out, it may be desirable to intervene in the well to alter or isolate the formation so that other formations may be perforated and produced without the production being burdened by fluid losses into depleted formations or by water intrusion from watered-out formations. Intervention is generally performed by wire line unit (WLU) work over, coiled tubing unit (CTU) work over or by a conventional work over rig. A WLU or CTU work over is performed by lowering an instrument or tool into the well using a specialized rig having a long spooled wire line or tubing for connecting or controlling the downhole instrument or tool from the surface. The conventional work over rig generally requires that all production tubing be removed from the well so that tools or instruments may be run into the well on a work string.

If the depleted or watered-out formations are lower in the well than the formation, the depleted or watered-out formation may be isolated from the well by using one of the three conventional intervention techniques described above. In a conventional intervention work over, material such as cement or sand may be deposited into the bottom of the well to form a plug to seal off the perforations in the depleted or watered-out formation, and to thereby isolate the depleted or watered-out formation from the new formation located above. Once a sand or cement plug is in place, another work over may be required to later remove it. Packers are tools that can be installed in a well during a work over to isolate depleted or watered-out formations.

Conventional workers to install or remove downhole plugs or packers are unnecessary if formations can be isolated or remotely controlled using downhole devices. Downhole devices, such as valves or chokes, may be installed in a pipe string as it is being made up and run into a well to enable the selective production, isolation or flow-control of fluids residing in the formations penetrated by a well. Surface-controlled downhole valves or chokes require continuous control lines that extend from the surface through the well to the depth at which the downhole devices are installed in the pipe string. Control lines must be to installed as the pipe string is being made up and run into the well.

Continuous control lines are generally stored and transported to the rig location on spools. The spools of control line are generally mounted on a horizontal axle on or near the rig floor so that the control line may be easily and smoothly "fed" to and fastened to the pipe string by reeling of the spool.

Oil and gas wells may be equipped with control lines for electrically, hydraulically or optically linking various downhole devices to the surface. Control lines may be used to receive data from downhole instruments and to selectively operate from the surface downhole devices such as valves, switches, sensors, relays or other devices. One use of control lines is to open, close or adjust downhole valves in order to selectively produce or isolate formations at locations deep in the well. A control line may transmit downhole data to the surface and communicate commands to the same or other downhole devices. The control line may comprise conductive wires or cables for electrically controlling downhole devices, fibers for optically controlling downhole devices, or small-diameter tubing for hydraulically controlling downhole devices. Control lines are generally of a small diameter relative to the diameter of the pipe string to which they are secured, and are generally between 0.5 and 6 cm in diameter. A plurality of control lines may be aggregated into a single umbilical that may exceed 10 cm in diameter. Control lines are generally secured along the length of the outer surface of a pipe string, generally parallel to the center axis of the bore of the pipe string. Continuous control lines are secured to the pipe string and installed in the well as joints of metal pipe are made up into a pipe string and run into a well. Control lines secured to pipe string are subject to being damaged and made useless if pinched or crushed by pipe slips used to grip and support the pipe string, such as during the process of making up the pipe string and running it into the well.

A spider is a device used on a drilling or work over rig for gripping and supporting the pipe string as joints of pipe are made up into the pipe string. The spider has an interior bore, generally aligned with the pipe string, through which the pipe string passes. The spider has a circumference arrangement of radially inwardly movable pipe slips disposed around the pipe string and within the internal bore. The pipe slips move radially inwardly to grip the outer surface of the pipe string and support the pipe string in the well when the pipe string is not supported by the elevator. It is important that the pipe slips in the spider uniformly engage and grip the pipe string in order to prevent crushing or damaging the pipe making up the pipe string. Each pipe slip within the internal bore of the spider applies a force radially inwardly against the outer surface of the pipe string. It is important that the pipe slips are concave around the pipe in order to contact the pipe over as large an interval as possible in order to minimize the localized stress imposed on the pipe by the pipe slips.

If a control line becomes pinched or trapped between the pipe slips of the spider and the outer surface of the pipe string, or if a control line is pinched between adjacent segments of the pipe slips as they move around and radially inwardly to contact the pipe string, the control line may be damaged and the capacity to receive data from downhole instruments or surface control of downhole devices may be lost or impaired. It is important that the method used to secure control lines to the pipe string be designed to prevent control line damage.

In many installations, it is desirable to secure multiple control lines along the length of the outer surface of the pipe string in order to allow data to be gathered from or surface control of multiple downhole devices. For example, but not by way of limitation, tools and other control valves or instruments may be made up into the pipe at various depths along the pipe string, and the number of control lines at any given depth depends on the depth and the configuration of the pipe string. Multiple control lines are especially useful in deep offshore wells that penetrate multiple formations. Existing designs may require four or more control lines for each string of pipe that is run into the well. Multiple control lines are most efficiently made, stored, transported and installed in bundles comprising control lines coupled together in a generally parallel, side-by-side configuration. Multiple control lines may require larger clamps to secure the bundle along the length of the outer surface of the pipe string.

A method has been developed for securing control lines to a pipe string as the pipe string is made up and run into a well. U.S. Pat. No. 6,131,664 ("the '664 Patent") is directed to using an elevated work platform constructed on the rig floor. The work platform is equipped with hydraulic tongs for making up the pipe string, and an opening above the well in the floor of the work platform that is generally aligned with the well and with an opening in the rig floor beneath the work platform. The work platform disclosed in the '664 Patent supports the spider and, when the pipe string is supported by the spider, the work platform must support the weight of entire pipe string. This requires the work platform to be built to support 200 tons or more. The work platform described in the '664 Patent must also provide sufficient work area for rig personnel to use the tongs to make up joints of pipe that are lowered and aligned in position above the pipe string to be threadably made up into the pipe string.

The '664 Patent discloses that control lines are provided to the pipe string from a separate work area maintained on the rig floor and below the level of the work platform. The control lines are stored on and continuously provided from spools that may be located lateral to the pipe string and adjacent to the opening in the rig floor. Clamps are installed by rig personnel working in the work area beneath the work platform to secure the control lines to the pipe string. One problem with the method and apparatus for installing control lines described in the '664 Patent is that the control lines and spools themselves may take up a significant area of the rig floor and present an obstacle to various operations.

What is needed is a method of safely securing control lines to a pipe string as the pipe string is being made up and run into a well. What is needed is a method and an apparatus that enables the safe and inexpensive installation of control lines that are being secured to a pipe string as it is made up and run into a well. What is needed is an apparatus for and a method of securing control lines along the length of a pipe string as it is being made up and run in a well that provides protection of control line while facilitating the addition and removal of control lines.

SUMMARY OF THE PRESENT INVENTION

The present invention utilizes a spider that is supported on a table elevated above a rig floor and one or more control line guides for directing control lines through a passage within the spider. The spider comprises a spider body and a plurality of pipe-gripping members, such as slips, received within a tapered bowl within the spider body. The one or more control line guides may include shaped guides, roller guides, slides, cable funnels and the like, either alone or in combination, to position and direct the pathway of control lines.

In one embodiment, the spider body may receive an elongated control line sleeve adapted for being received is within a body for containment and protection of one or more control lines from pinching or crushing between slips, or between the slips and the pipe string secured by the slips. The elongated control line sleeve has an opening at each end with one opening disposed generally upwardly and the other opening disposed generally downwardly. The control line sleeve may also assist in directing and positioning the control lines along the pipe for coupling thereto. Optionally, the sleeve may be secured to any structural member, including but not limited to the slip or slips and the spider body, and suspended or supported within the spider. Alternatively, the sleeve may be secured directly to or within the spider, the spider door or the spider body, such as in the bowl of the spider or in or on the spider door. The sleeve must also be selectively operable, such as with a slot in one side, in order to receive a control line or to allow withdrawal of a control line.

In another embodiment, the spider components form a control line passage that is isolated from the slips and the pipe. Such a passage may be formed by a control line gate securable to the spider body or to the spider door, or both, to form the passage between the control line gate and the spider body or spider door. If the control line gate is hinged to a spider component, then the control line is positioned in, or removed from, the passage by opening the spider door and the control line gate. The spider is also opened in order for the spider to be received around or removed from a pipe string. Still further, while the control line passage itself will prevent contact between the control line and the slips, the control line passage may further include a sleeve, which may comprise two or more parts, to reduce abrasion to the sides of the control line. The control line passage and any sleeve used in cooperation with the passage must be selectively operable in order to receive a control line or to allow withdrawal of a control line. With a pipe string positioned within the spider, the opening of the passage and sleeve will typically require supporting the pipe string from the elevator so that the spider can be released and the spider door can be opened. The elevated table must then also include a causable slot extending from the spider door some distance away from the spider so that opening the slot provides sufficient clearance for the spider door to open. Consequently, with the slot open and the spider door open, a control line can be positioned within, or removed from, the spider body for running control line or removing control line. It is not necessary for the slot to extend to the edge of the elevated table, but a slot extending to the edge will facilitate installation of the table around or removal of the table from an existing pipe string.

In a still further embodiment, the control line gate may be slidable or selectively positionable between the pipe string and at least one of the spider door or the spider body so that the control lines are retained within the control line passage. Therefore, the control line gate is positionable to form the control line passage even with the pipe string extending through the spider and with the spider door closed. This embodiment with selective position ability of the control line gate provides a major operational advantage in that a control line can be run through the spider and control lines may be added to or removed from the passage, at all times protected from the slips and the pipe string without having to open the spider door. Accordingly, the control line gate may be installed, removed and positioned while the pipe string is supported by either the elevator or the spider.

The slidable or selectively positionable control line gate is preferably positioned by inserting it with one side facing the pipe string and another side facing the control lines and at least one of the spider door or the spider body. The control line gate is preferably also inserted from the top. After insertion, the control line gate is secured in position. The control line gate is preferably securable to the spider body, the spider door, or a combination thereof Alternatively, the control line gate may be secured or suspended in position from some other structure, such as an assembly securing the control line guides. In a most preferred embodiment, the control line gate has two edges that are slidably received in a pair of slots formed in or on the inner face of one of the spider door or the spider body, or a combination thereof, so that the control line gate can be lifted out of the slots for receiving an additional control line into the passage and then reinstalled into the slots with all the control lines retained within the passage. As used herein, a "slot" may refer to a slot, track, guide, ridge or any feature that facilitates sliding engagement and coupling.

The control lines are fed to the well from generally above the spider. The control lines are routed from a spool and engage one or more guides adapted for being roll ably secured to the spider body. The roller guides direct the control line into an upwardly disposed opening in the spider, through a passageway that is unobstructed by the slips or the pipe string, and along the length of the pipe string into the borehole. If a control line protective sleeve is being used in association with the spider, then the roller guides direct the control line into an upwardly disposed open end of protective sleeve, through the elongated sleeve and out of the downwardly disposed open end of the sleeve. The exposed portion of the pipe string and control line between the elevated table and the rig floor provides a clamping zone where clamps can be installed to secure the control lines to the exterior surface of the pipe string.

The method and apparatus of the present invention allows one or more control lines to be secured along the length of a pipe string as the pipe string is being made up and run into a well. The method and apparatus of the present invention allows control lines to be secured to a pipe string above the rig floor and below the spider that is supported by an elevated work platform strong enough to support the weight of the pipe string. The method and apparatus of the present invention improves rig safety and operation by top-feeding the control line through the spider and thereby preventing impairment of escape routes on the rig floor.

The elevated table supports the spider at a generally fixed distance above the rig floor to permit rig personnel access to the outer surface of the portion of the pipe string located below the elevated spider and above the rig floor. Access to the outer portion of the pipe string below the spider and above the rig floor permits rig personnel to install fasteners to secure control lines to the pipe string.

According to the presently preferred embodiment, a control line is provided to the pipe string from above the spider. Preferably, the spool may be positioned at a remote location on the rig floor and the control line passed up and over an elevated sheave or pulley so as to come downwardly to the spider. The spool may be rotatably mounted in a fixed location that is a sufficient distance above the spider and in sufficient proximity of the axial center line of the pipe string to provide a favorable approach angle. The control line should not be bent or deflected at an angle exceeding manufacturer recommendations as the control line is fed downwardly to and into the spider. Preferably, the angle formed between the control line and the pipe string will not exceed about 60 degrees, and more preferably, will not exceed about 45 degrees. Rollers, pulleys or sheaves may be used to limit localized bending of the control line. The control line may be routed or threaded over a roller guide secured above the spider to strategically direct the top-fed control line from the spool through the spider and along the length of the pipe string so that the control line can be secured to the pipe string. The control line is secured to the pipe string with fasteners, such as clamps, sleeves, bands, clips or other fasteners at a position beneath the elevated spider, but in the adjacent area of the rig floor. The control line may be secured along the outer surface of the pipe string at any radial or circumference location of the pipe string below the spider, but the control line is preferably secured along the outer surface of the pipe string at a radial or circumference location that is generally aligned with the passage through the spider. Accordingly, the control line passes through the spider without being damaged by the pipe slips within the internal bore of the spider.

It should be recognized that any number of control lines may be supplied to the pipe string in accordance with the present invention. Multiple control lines may be supplied as a bundle or they may be supplied separately.

Advantageously, the fasteners or clamps used to secure control lines to the pipe string may be designed independent of restrictions imposed by the size or configuration of the internal bore of the spider. The fasteners may be secured at any desired spacing along the length of the pipe string in the clamping zone below the table and above the rig floor, such as one fastener per joint of pipe. It is specifically anticipated that multiple fasteners may be used along the length of a single joint of pipe or single stand of pipe, or that entire joints or stands of pipe may be skipped.

In a still further embodiment, the invention provides a method comprising the steps of securing an instrument to a pipe string, wherein the instrument is adapted to include a control line extending therefrom, lowering the pipe string so that the instrument and control line pass through a spider having a plurality of gripping members, and positioning a control line gate to separate the control line from the gripping members. Preferably, the control line gate also separates the control line from the pipe string. Most preferably, the steps can be repeated to receive a plurality of control lines as additional instruments or downhole devices are made up into the pipe string.

The foregoing, as well as other, objects, features, and advantages of the present invention will be more fully appreciated and understood by reference to the following drawings, specification and claims.

DETAILED DESCRIPTION OF PREFERRED EMBODIMENTS

Figure 1:
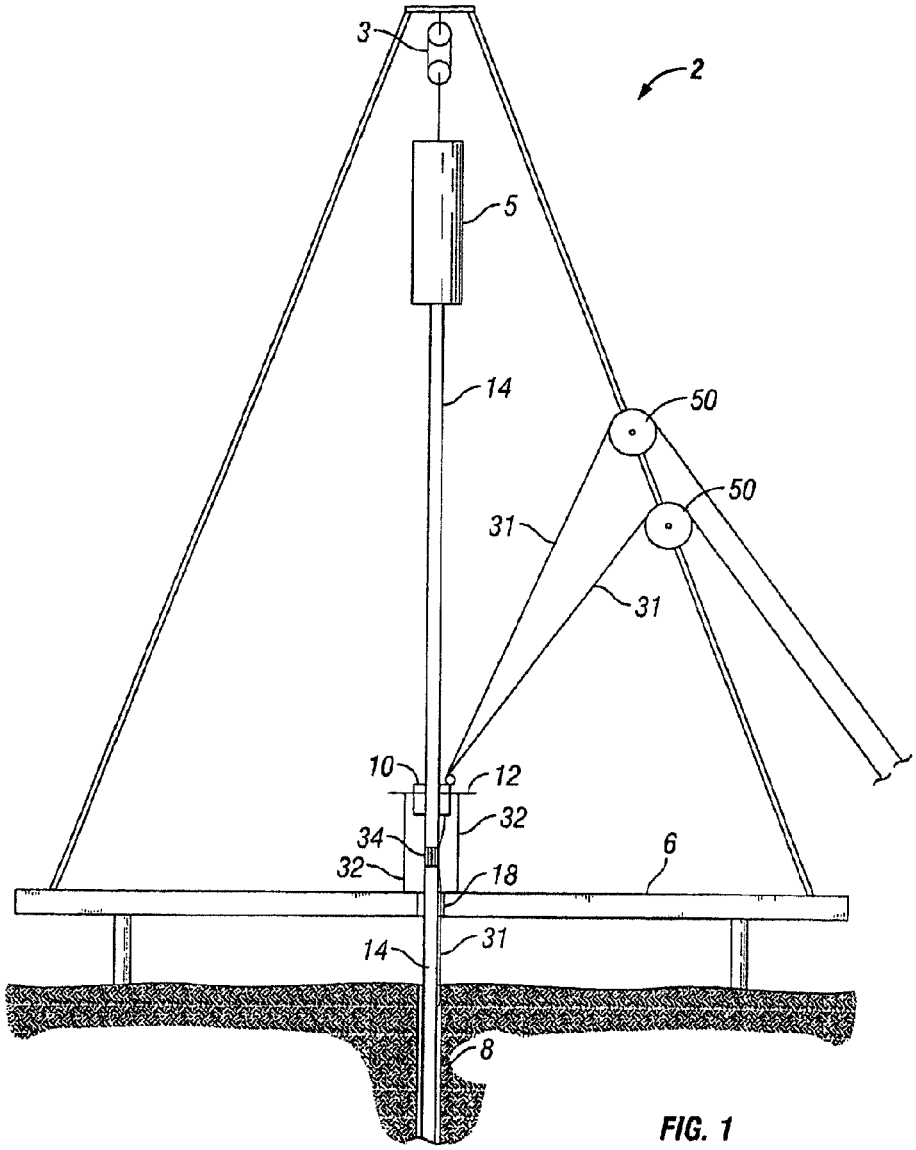
FIG. 1 illustrates a drilling rig for joining tubular and supporting a pipe string in a well bore.

FIG. 1 illustrates a drilling rig 2 for joining tubular and supporting a pipe string 14 in a well bore 8. The rig 2 has a generally conventional structure and operation, including a draw works 3, lift elevator 5 with or without a top drive, and a rig floor 6. However, the rig 2 also includes an elevated table 12 that supports the spider 10 above the rig floor 6 at a distance above the rig floor to permit rig personnel access to the outer surface of the portion of the pipe string 14 located between the elevated spider and the rig floor. One or more control lines 31 are supplied from one or more spools and the control lines are directed over a pulley or sheave 50 to the top of the spider 10 and pass through the spider along the pipe string 14. Accordingly, rig personnel or equipment have access to the pipe string 14 and the control lines 31 below the elevated spider to allow the installation of fasteners 34 to secure control lines 31 to the pipe string.

The control line may be supplied from a spool located on the rig floor or elsewhere, so long as the control line is directed angularly downward to the spider 10, such as by passing the control line from a spool upwardly over one or more pulleys or sheaves 50 and then directing the control line angularly downward to the spider.

Figure 2:
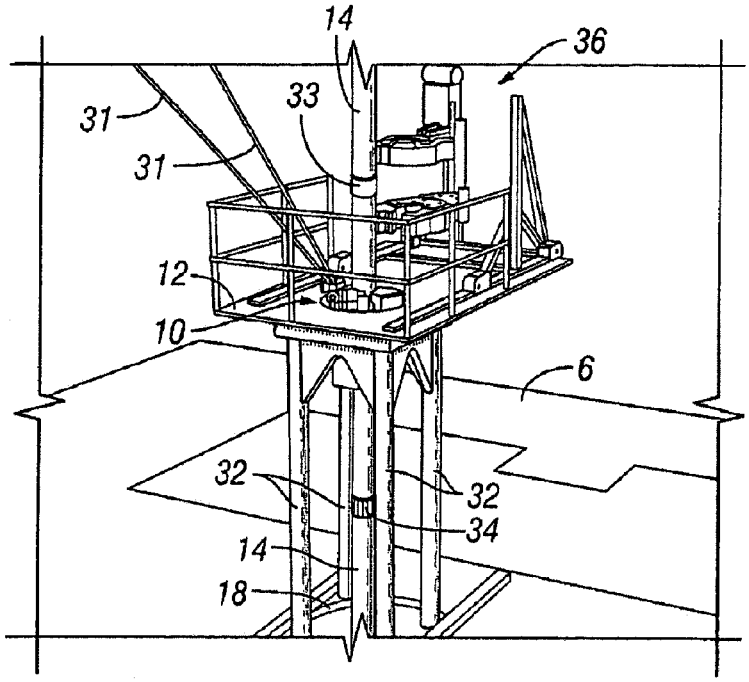
FIG. 2 is a perspective view of a spider supported on an elevated table in cooperation with control line guides directing top-fed control lines through the spider and along the pipe string.

FIG. 2 is a perspective view of one embodiment of a spider 10 supported on a table 12 elevated above the rig floor 6. The one or more control lines 31 are guided at a downward angle from the one or more sheaves 50 (see FIG. 1) to the spider 10 and directed through the spider and along the pipe string 14. The elevated table 12 is supported above the rig floor 6 on legs 32. While the elevated table is shown to facilitate the use of power tongs 36, it should be recognized that a top drive may be coupled between the draw works 3 (see FIG. 1) and the elevator 5 (see FIG. 1) in order to facilitate the makeup of tubular without power tongs. In fact, the use of a top drive may be preferable to power tongs for a number of operational reasons as well as simplifying the construction of the elevated table 12. Still, it is generally necessary to have either a top drive or power tongs in order to rotate and makeup tubular. Here, a coupling 33 is shown securing the ends of two adjacent pipe sections together.

Figure 3:
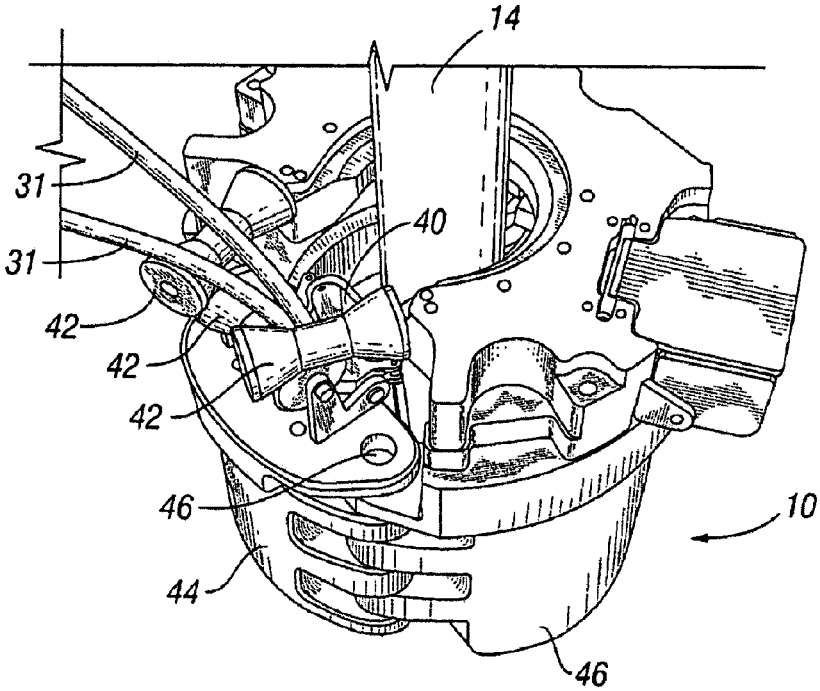
FIG. 3 is a top perspective view of the spider in more detail without the elevated table.
Figure 4:
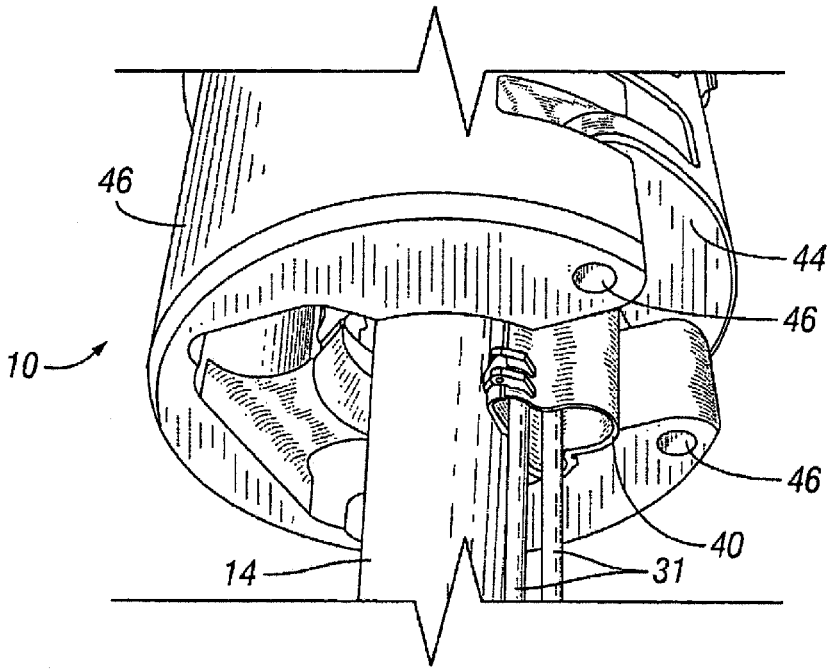
FIG. 4 is a bottom perspective view of the spider in more detail without the elevated table.

FIGS. 3 and 4 are top and bottom perspective views, respectively, of the spider 10 in more detail without showing the elevated table. One or more control line guides 42 are disposed to direct the one or more control lines 31 to a passage that extends through the spider. The number of control line guides 42 is not critical and not necessarily equal in number or angle to the control lines directed through the spider. However, it is preferred that the one or more control line guides provide sufficient radial coverage around the perimeter of the passage so that the control lines are not pinched and do not disengage from the rollers due to variations in the radial or axial angle at which the control line is delivered. The embodiment shown has a set of three control line guides disposed about the upper opening to the passage. The passage 16 through the spider is provided between two adjacent slips 24 (see FIG. 6).

In a preferred embodiment, the passage includes a sleeve 40 that extends along the slips 24 (see FIG. 6) through spider 10 to keep the control line within the passage and prevent the control line from being pinched, crushed, or abraded by or between the slips and the pipe string or the bowl. The sleeve may be tapered or contoured to accommodate the shape of the passage and to prevent or minimize damage to the control line. The sleeve 40 may have various shapes and sizes, but serves to protect the control line 31 that passes through the sleeve. The sleeve prevents the control line from straying to the edge of the passage 16 where the control line could become pinched by the slips 24 (see FIG. 6) as they close around the pipe string 14. Preferably, the sleeve provides a smooth interior surface that prevents abrasion or snagging of the control line. The sleeve is most preferably a smooth metal tube, but it may also be a rigid or resilient polymer material. Preferably, the sleeve extends a sufficient distance to protect the control line from substantially all potential pinch-points, abrading surfaces and the like before allowing the control line to exit along the pipe string below the spider. The sleeve can also serve or assist with the function of directing the control line into a desired alignment or position about the pipe string. Upon exiting the lower end of the passage, the control line lays along the pipe string 14 below the spider to facilitate coupling the control line to the pipe string.

In the embodiment of FIGS. 3 and 4, the control line guides 42 are secured to the top of the spider and the sleeve 40 is secured to the bowl of the spider. Alternatively, the control line guides and sleeve may be integrated together and secured to the spider at a common point or the control line guides and sleeve, alone or in combination, may be supported from the elevated table or some other support structure. Furthermore, it is preferred to dispose the control line guides and optional sleeve in alignment with a spider door 44 in the side of the spider 10. The door 44 is secured to the spider body 46 by inserting pins or bars into the aligned holes 46 through interdigitated members of both the door and the body. The door can be opened by removing one or both pins, but preferably a single pin is removed so that the door can be swung open in a manner hinged by the remaining pin. The door is needed in order to install the spider around an existing pipe string 14. Furthermore, it may be easier to retrofit an existing spider with control line guides and the optional sleeve if these components are in alignment with a door 44. Optionally, an existing spider door may be replaced with a new spider door having the control line guides and a sleeve coupled to it or formed in it.

It should be noted that a variety of tools or devices may be used in place of or in cooperation with the roller guides 42 to bend and direct the control lines 31 to their intended position for being secured to the pipe string 14 and run into the well. Persons skilled in the art will appreciate that a control line guide may include the use of shaped guides, roller guides, cable funnels and the like, either alone or in combination, to position and configure control lines.

Figure 6A:
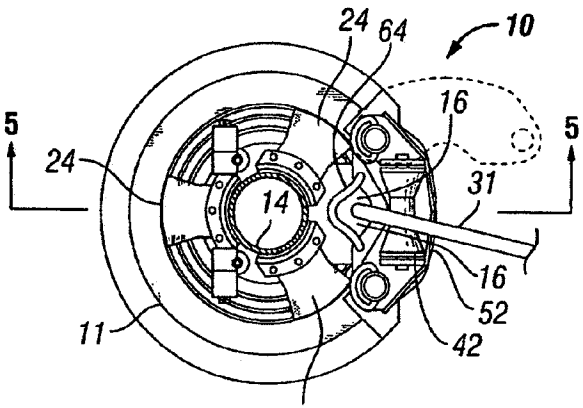
FIGS. 6A-6C are top views of the spider assembly showing the control line passage disposed outside the path of adjacent spider slips.
Figure 6C:
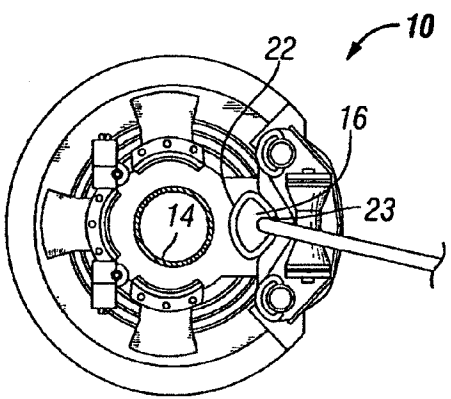
Figure 5:
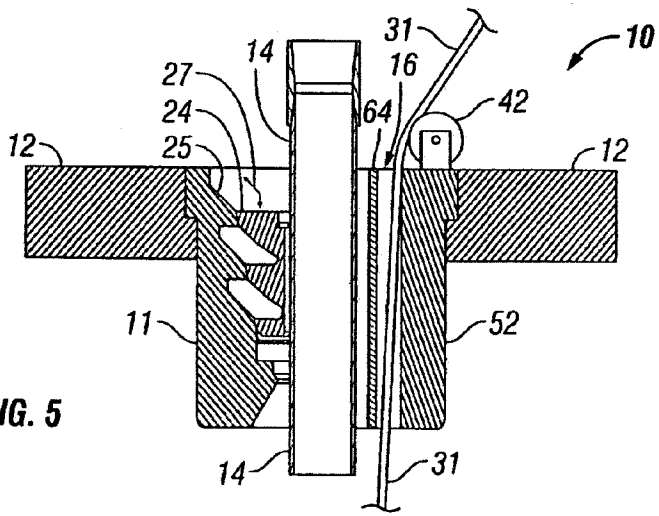
FIG. 5 is a cross-sectional side view of the spider showing the spider slips and the control line passage through the spider.
Figure 6B:
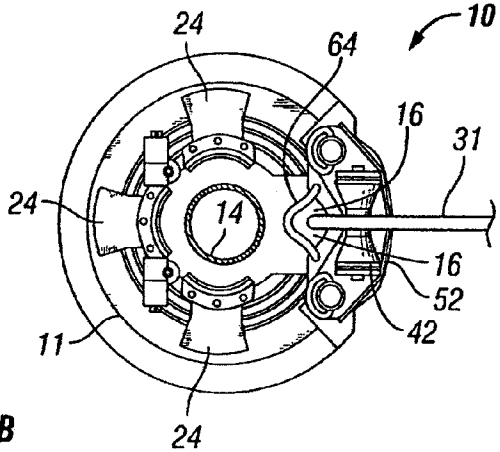

FIGS. 5, 6A and 6B include a schematic cross-sectional side view and two top views, respectively, of the table-elevated spider assembly 10 showing the spider slips 24 and a control line passage 16 through the spider 11 outside the path of the slips. More particularly, the control line passage 16 is disposed within the spider, but outside the path or range of motion of the spider slips as they open and close around the pipe string. The pipe slips 24 are disposed within the spider 11 in a generally radially distributed arrangement within the internal bore 25 of the spider 11. The pipe slips 24 are downwardly and radially inwardly movable (see arrow 27) to forcibly engage the outer surface of the pipe string 14 to grip and support the pipe string 14 when the weight of the pipe string 14 is not supported by the lift elevator (not shown). Still, the slips 24 move along a path between an engaged position (see FIG. 6A) and a disengaged position (see FIG. 6B) leaving room within the spider for a control line passage 16 that is outside the path of the slips. While only one control line guide 42 is shown in FIGS. 5 and 6A-C for clarity, additional control line guides may be used, such as those shown in FIGS. 1A, 1B and 9.

In FIGS. 5, 6A and 6B, the spider assembly 10 includes a control line gate 64 that extends generally vertically and generally along the slips 24 through the bore of the spider 11. The gate 64 may have various shapes and sizes, but serves to protect the control line 31 that passes through the passage 16. The control line gate prevents the control line from straying into a position where the control line could become pinched by the slips 24 as they engage the pipe string 14. Preferably, the control line gate provides a smooth interior surface that prevents abrasion or snagging of the control line.

Figure 10:
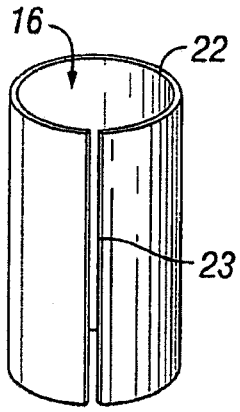
FIG. 10 is a perspective view of a simple sleeve having a cut along the length of the sleeve to receive a control line.

In FIG. 6C, an optional sleeve 22 can be used to form the control line passage 16 instead of the control line gate 64. The sleeve may be secured to the spider or to the retainer so that it reciprocates as a unit along with the spider, retainer and control line guide. The sleeve is preferably a smooth metal tube, but it may also be a rigid or resilient polymer material. Preferably, the sleeve extends a sufficient distance to protect the control line from substantially all potential pinch-points, abrading surfaces and the like before allowing the control line to exit along the pipe string below the spider. The sleeve can also serve the function of directing the control line into a desired alignment or position about the pipe string, especially if the upper end extends above the spider at an appropriate angle to receive the control line. For a number of operations, it is beneficial for the sleeve to be operable and causable from the side so that a control lines can be secured within the sleeve without requiring threading of the control line therethrough. As shown in FIG. 10, an elongated gap 23 along the length of the sleeve may service this purpose, but both edges of the elongated gap should be securable so that the control line does not inadvertently exit the sleeve.

In one embodiment, the opening between the rig floor 6 and the table elevated spider is approximately 1.5 to 2 meters (shown in FIG. 1), or just enough to permit rig personnel working on the rig floor 6 to safely and efficiently access a portion of the outer surface of the pipe string 14 at a location below the spider 10 and above the rig floor 6. Smaller or larger openings may be employed advantageously as dictated by space or other limitations on the rig floor 6. The horizontal spacing between adjacent legs 32 is preferably about one meter or more as desired to provide stability and support for the elevated table 12 which must be able to support the weight of the entire pipe string. The horizontal spacing between adjacent legs 32 shown in FIGS. 1 and 2 provides generally rectangular openings through which an operator may access the control lines 31 and the pipe string 14 for attaching a clamp or fastener before advancing the pipe string further through the opening 18 in the rig floor 6. These openings provide rig personnel with access to a portion of the length of the outer surface of the pipe string 14 below the retainer 12 and spider 10 and above the rig floor 6 for installing a control line fastener 34. The fastener 34 is preferably a full-enclosure type that substantially surrounds the entire circumference of the pipe string 14 at a given elevation and secures the control lines 31 at intervals along the length of the pipe string 14.

The fastener 34 used to secure the control lines 31 to the pipe string 14 may comprise a clamp, clip, spring, wire, strap, band or any fastener or other device that is suitable for securing a control line 31 to the outer surface of the pipe string 14. Typically, the inside of the fastener 34 is adapted to fit the cylindrical outer surface of the pipe string 14 to which it is secured, and may be configured with one or more "pockets," or circumferentially upset portions, to accommodate and to secure one or more control lines 31 from circumference and/or axial movement relative to the outer surface of the pipe string 14 to which the control lines 31 are secured. Another mechanical fastener, such as a screw, clip, or a bolt and nut, may be employed to close and tighten the fastener 34 in place on the pipe string 14.

After the fastener 34 is applied and the control line 31 is secured to the pipe string 14, the pipe string 14 and control line 31 are lowered into the well 8 through the opening 18 in the rig floor 6. Additional fasteners 34 may be added with each new joint of pipe that is added to the pipe string 14 or, in the alternative, several joints of pipe may be made up into the pipe string 14 before an additional fastener 34 is installed to secure the control line 31 to the pipe string 14. Furthermore, the fastener may be position around the pipe, around the coupling, or some combination thereof.

Optionally, the control line sheave 50 and/or the control line guides 42 may be adapted for applying a tensioning force to the control lines 31 and to prevent inadvertent over-reeling from the control line spools (not shown).

When the control line 31 comprises a bundle of control lines secured one to the others, the control line bundle may be more stiff and inflexible than a single control line 31. The guides 42 may be adapted to assist in bending and redirecting the control line bundle into a parallel position longitudinally along the outer surface of the pipe string 14 suitable for application of a fastener for securing the bundle to the pipe string 14. It should be recognized that any number of rollers may be used, such as an array of rollers in series forming an arc having an effective diameter that prevents the control line from becoming stressed from sharp bends.

Figure 7A:
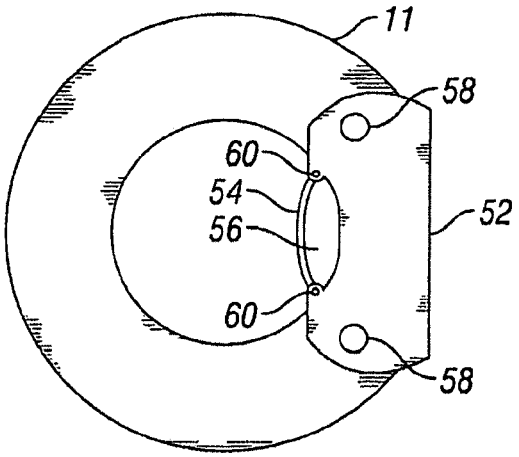
FIG. 7A and FIG. 7B are top schematic views of a spider assembly with a spider door and a control line gate forming a passage to receive one or more control lines or bundles.
Figure 7B:
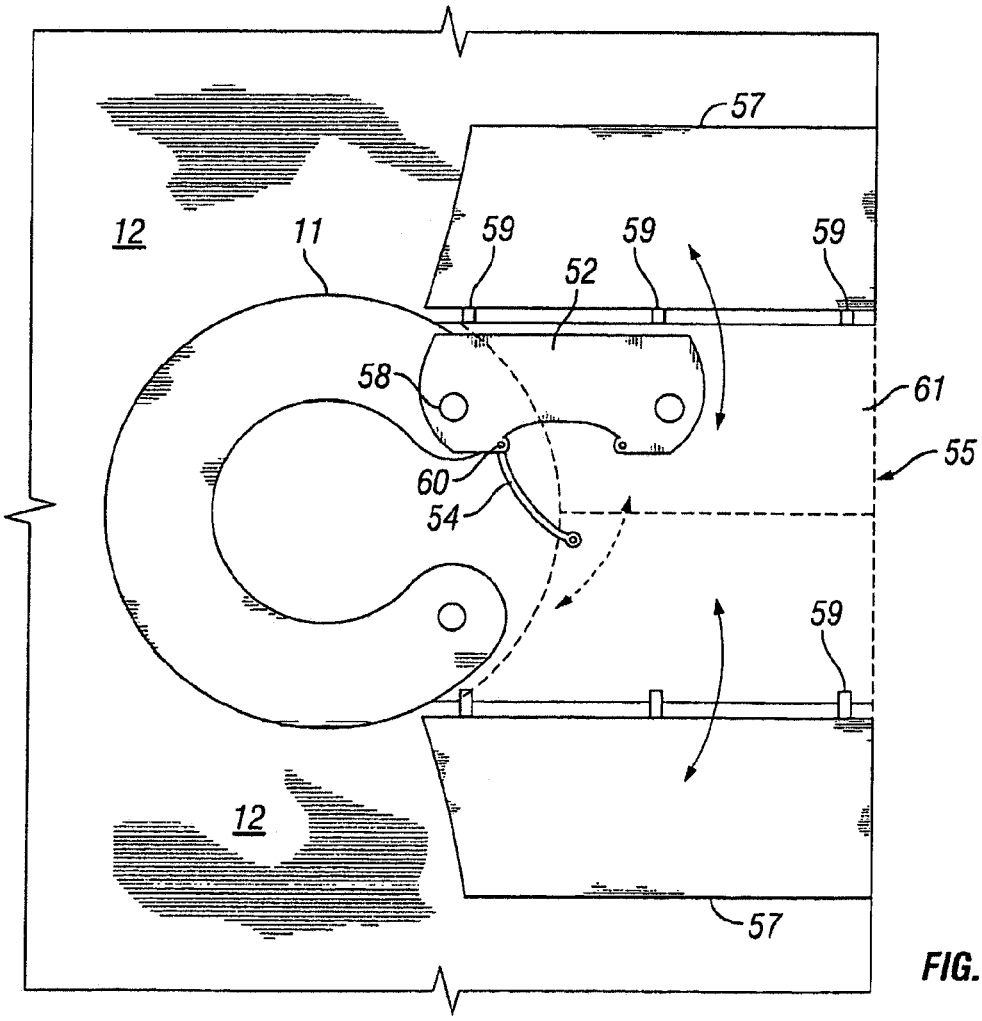

FIG. 7A and FIG. 7B are schematic top views of a spider 11 with a spider door 52 and a control line gate 54 forming a passage 56 to receive control lines. In FIG. 7A, the spider door 52 is closed and secured to the spider body 11 by pins 58 and the control line gate 54 is secured to the spider door by pins 60. Accordingly, the spider door and control line gate are in their proper positions for running pipe and control line into or out of the well. In FIG. 7B, the spider 11 has the spider door 52 in an open, yet secured, condition as a result of removing only one of the pins 58. This allows the door to be hinged opened, as shown. Similarly, a single pin 60 has also been removed to allow the control line gate 54 to hinged open relative to the spider door 52. In this position, a control line can be received between the spider door 52 and a control line gate 54. After the control line is positioned between the door and the gate, the control line gate 54 is shut and secured by insertion of the second pin 60 and the spider door 52 is closed and secured by insertion of the second pin 58. It should be recognized that either or both of pins 60 and/or either or both of pins 58 may be removed during the process of receiving or removing a control line. It should also be recognized that the spider door 52 is the robust structural door that bears a load when the spider is supporting the weight of the pipe string, whereas the control line gate 54 has a much lighter weight construction intended only to restrict adverse or errant lateral movement of the control line.

FIG. 7B also shows that the elevated table 12 may be equipped with a selectively causable slot 55 that is opened in order to allow the spider door 52 of a recessed spider 11 to be opened without being raised. The slot 55 is cut into the floor of the table 12 and covered during operations that do not involve opening the spider door 52. The slot 55 may be covered in many different manners, including a pair of opposing doors 57 that are secured to the edge of the slot by hinges 59. A support beam 61 is at least positionable under the slot to support the doors 57 in the closed position. The beam 61 preferably can be removed if necessary to facilitate removing the elevated table 12 from the pipe string.

Figure 8:
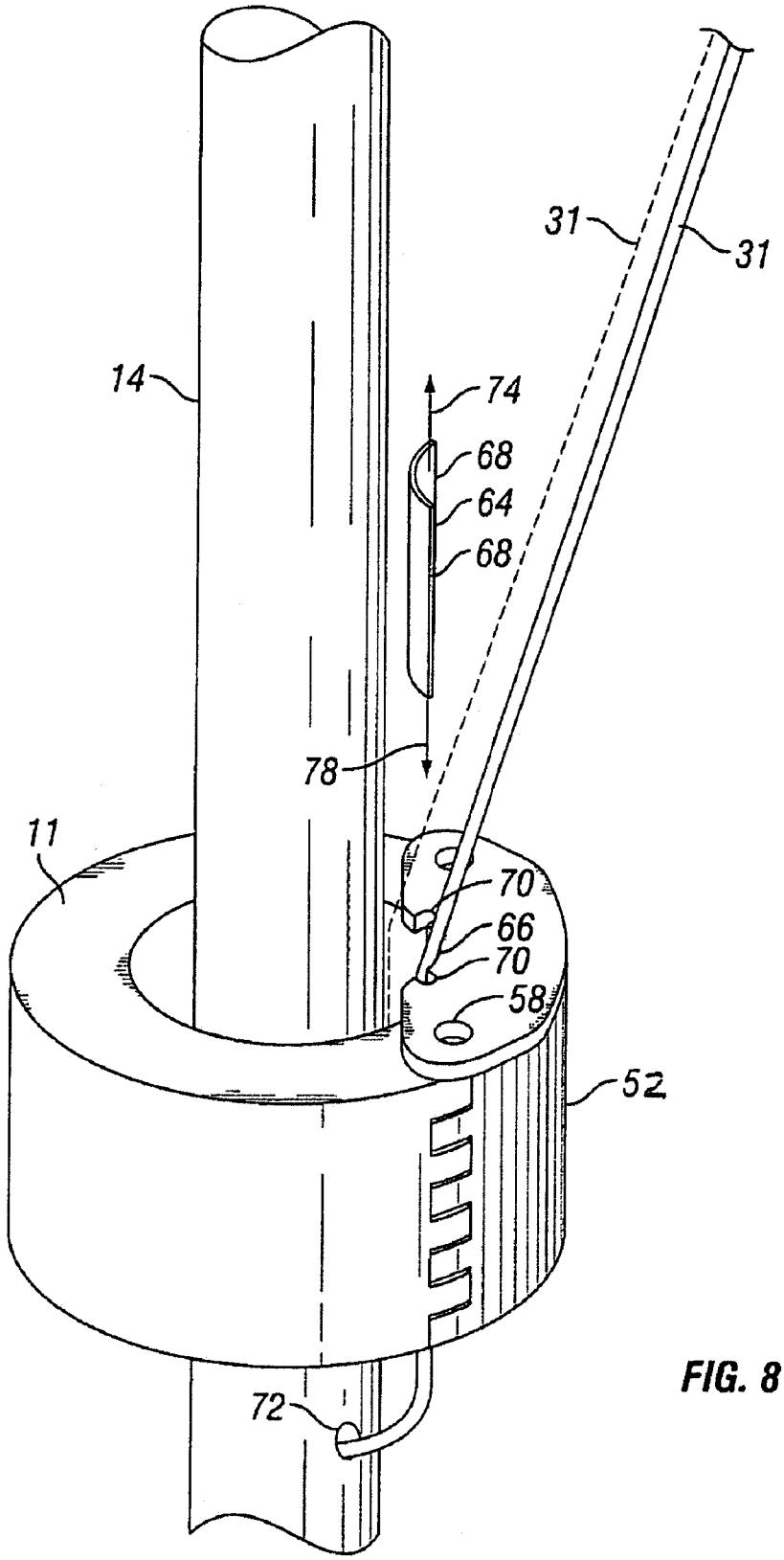
FIG. 8 is a perspective view of a spider assembly with a spider door having a sliding control line gate forming a passage to receive control lines.

FIG. 8 is a perspective view of a spider 11 with a spider door 52 having a control line gate 64 used to form a passage to receive one or more control lines. The control line gate 64 cooperates with the inner surface 66 of the spider door 52 to form the control line passage 56 (see FIG. 9). In the embodiment shown, the control line gate 64 has side edges 68 that are vertically slidably receivable within slots 70 formed in the inner surface 66 of the spider door. Alternately, a control line gate may comprise two generally elongated tubular members one circumferentially slidably received inside the other and each having a circumference slot extending the length of the member so that the members are slidable to align the slots to provide for ingress and egress of a control line into or out of the interior bore of the control line guide when the slots are aligned. Slidably rotation of one member relative to the other closes the slot in the control line guide by moving the slot of one member out of alignment with the slot of the other member. This embodiment of a control line guide is shown in FIGS. 5-8 and 14 of U.S. Pat. No. 6,920,931. U.S. Pat. No, 6,920,931 is incorporated herein by reference.

In accordance with the present invention, there are three primary methods for positioning a control line within the control line passage that extends through the spider. In all three methods of operation, a section of pipe having an associated instrument (i.e., a "downhole device") is secured to the pipe string and lowered so that the point 72 for terminating a control line to the downhole device is below the spider 11. The control line and the terminating point on the downhole device may be connected using any available coupling, such as a threaded coupling. Furthermore, the control line may be of any available type, such as an electrical line or fluid tubing.

In a first method for positioning the control line within the passage, the control line has been connected or terminated to the downhole device prior to lowering the terminating point 72 through the spider. The downhole device and pipe string are supported by a lift elevator (not shown) and lowered so that a control line associated with the downhole device is positioned near the spider. The control line gate 64 is vertically slidably removed upwardly out of the slots 70 to provide more room for the control line to pass through the spider. While the pipe gripping members, such as slips, of the spider are disengaged as the pipe is lowered, it may be desirable to generally radially align the terminating point and the control line with the control line passage so that the control line is not damaged as it initially passes through the spider. Accordingly, as the pipe string is lowered further, the control line is drawn through the spider and lies along the surface of the downhole device or pipe string. After the terminating point has passed completely through the spider, the control line 31 is drawn generally radially outwardly toward the inner surface 66. Next, the control line gate 64 is vertically slidably replaced downwardly into the slots 70 to form the control passage around the control line. Once the control line gate is securely in position, normal pipe running operations may continue. It should be noted that to avoid pinching the control line, it is important to position all control lines within the control line passage at any time that the gripping members of the spider are being set to grip the pipe. Furthermore, it is preferable to position all control lines within the control line passage as soon as the control line extends through the spider.

The second method includes running the terminating point of the downhole device through the spider and into the access area below the spider, then threading the end of the control line through the control line passage so that the control line can be terminated to the downhole device in the access area below the spider. In this manner, the control line gate does not require opening or removal.

The third method for positioning the control line within the passage includes running the terminating point of the downhole device through the spider and into the access area below the spider, then terminating the end of the control line to the downhole device with the control line extending laterally from a spool. In order to position the control line within the control line passage, it is necessary to open the slot 55 adjacent the spider 11, open the spider door 52, and remove the control line gate 64 (or open the control line gate 54). After moving the control line into the control line passage, the control line gate is replaced or closed, the spider door is shut and the slot is closed. The control line is then properly secured so that normal pipe running operation can continue.

Therefore, as discussed above, one exemplary method would include the following steps. First, the control line gate 64 is removed as indicated by the upward arrow 74. Second, the pipe string is advanced downwardly so that the point of connection 72 of the control line is below the spider 11, as shown. Next, the control line is positioned into the control line passage by drawing the control line in the direction of the outward arrow 76. Finally, the control line gate 64 is reinstalled as indicated by the downward arrow 78. The pipe string may then be run further into the well and the spider set in preparation for adding additional pipe sections or stands to the pipe string. The control line may be clamped to the pipe string below the spider at appropriate points according to the previous discussion.

Figure 9:
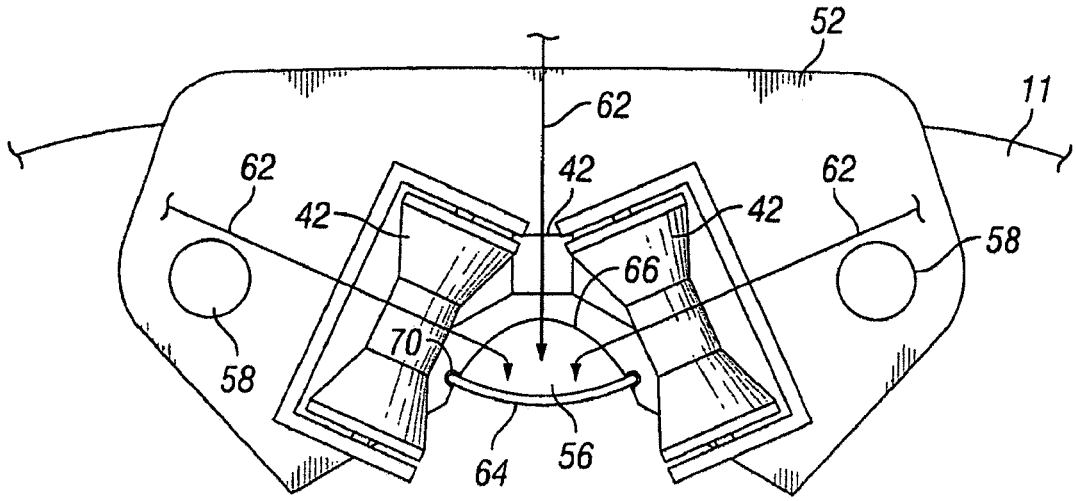
FIG. 9 is a top schematic view of a control line guide positioned on the spider door and generally aligned to direct control lines over the control line guides and into the passage between the spider door and the control line gate.

FIG. 9 is a schematic top view of a set of three control line guides 42 positioned on the spider door 52 and generally aligned to direct control lines over the control line guides 42 and into the control line passage 56 formed between the control line gate 64 and the inner surface 66 of the spider door, or, alternatively, within a control line sleeve 22 as shown in FIGS. 6C and 10. The control line passage is formed within the spider and outside the path of the gripping members or slips 24. The control lines may follow any one or more of the paths shown schematically by arrows 62. Further, the control lines may enter from almost any radial angle toward the passage 56.

The terms "comprising," "including," and "having," as used in the claims and specification herein, shall indicate an open group that may include other elements not specified. The term "consisting essentially of," as used in the claims and specification herein, shall indicate a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "an assembly having a control line guide" should be read to describe an assembly having one or more control line guide. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used in the specification to indicate that an item, condition or step being referred to is an optional (not required) feature of the invention.

While a preferred form of the present invention has been described herein, various modifications of the apparatus and method of the invention may be made without departing from the spirit and scope of the invention, which is more fully defined in the following claims.

What is claimed is:

1. An apparatus for running well pipe into a well with control lines attached to the pipe, comprising:

a support structure for supporting a spider at a distance above a rig floor sufficient to provide an accessible work space between the support structure and the floor;

a spider supported by the support structure for holding a pipe string extending through the support structure and into the well, wherein the spider has a plurality of movable pipe gripping members; and a control line passage through the spider and outside the path of adjacent pipe gripping members.

2. The apparatus of claim 1, wherein the control line [guide] *passage* is selected from a shaped guide, a roller guide, a cable funnel, and combinations thereof.

3. The apparatus of claim 1, further comprising:

a protective control line sleeve extending through the passage and receiving the control line through the protective sleeve.

4. The apparatus of claim 1, wherein the control line passage is formed between a control line gate and a spider door.

5. The apparatus of claim 4, wherein the control line gate is hinged connected to the spider door.

6. The apparatus of claim 4, wherein the control line gate is slidably receivable by the spider door.

7. The apparatus of claim 1, further comprising:

a control line guide positioned above the spider to direct control line downward into the control line passage.

8. A method for running a well pipe into a well with control lines attached to the pipe, comprising:

securing a spider having a passage above a rig floor;

supplying the control line downward through the passage adjacent slips in the spider and along the pipe to a location below the spider and above the rig floor;

securing the control line to the well pipe below the spider; and lowering the pipe and secured control line into the well.

9. The method of claim 8, wherein the passage includes a protective sleeve that prevents damage to the control line passing through the sleeve.

10. An apparatus for running well pipe into a well with control lines attached to the pipe, comprising:

a support structure for supporting a spider at a distance above a rig floor sufficient to provide an accessible work space between the support structure and the floor;

a spider supported by the support structure for holding a pipe string extending through the support structure and into the well;

a clamp between the rig floor and the spider for securing a control line to the well pipe; and one or more control lines extending from a supply source downward through a passage in the spider and to the clamp and along the pipe.

11. The apparatus of claim 10, further comprising:

a protective sleeve extending through the passage and receiving the control line through the protective sleeve.

12. A method of inserting an axially extending pipe string and one or more control lines into a well, comprising the steps of:

providing an elevated support structure over a floor opening on a rig floor whereby an access area is formed between the support structure and the rig floor;

supporting the pipe from the elevated support structure using a spider whereby the pipe extends axially through the access area and through the floor opening;

feeding, from a supply source, one or more control lines downward through a passage in the spider and to the pipe; and lowering the pipe and the control lines through the floor opening while feeding control lines from the supply source through the passage in the spider.

13. The method of claim 12, comprising the further step of adding pipe to the pipe string above the support structure.

14. The method of claim 12, comprising the further step of elevating a work area of the personnel adding pipe to the string above that of a work area of the personnel securing the control lines to the pipe.

15. The method of claim 12, further comprising the step of moving a power tong away from the pipe string when the power tong is not in a working position.

16. The method of claim 12, wherein the passage includes a protective sleeve that prevents damage to the control line passing through the sleeve.

17. The method of claim 12, wherein the control lines are fed through the passage in the spider by guides to orient the control lines with the pipe.

18. A system for inserting a pipe string and one or more control lines into a well, comprising:

an elevated support floor spaced above a rig floor having a rig floor opening;

an access opening defined between the elevated support floor and the rig floor;

a spider carried by the support floor for holding a pipe string extending through the rig floor opening;

a pipe makeup area carried by the support floor for adding pipe to or removing pipe from the pipe string;

a control line supply source for supplying control line to the well;

a control line extending from the supply source downward through a passage in the spider and along the pipe string; and a clamp securing the control line to the well pipe.

19. The system of claim 18 wherein the pipe makeup area includes a power tong.

20. The system of claim 18 wherein the pipe makeup area comprises a personnel work area having tools for making up and breaking out pipe connections in the pipe string.

21. The system of claim 18 wherein the access opening provides an area sufficiently large to permit personnel entry for manual application of a clamp and control line to the pipe string below the support floor.

22. The system of claim 18 wherein the control line supply source comprises a reel of control line feeding the control line downward through the spider and along the pipe adjacent the access opening.

23. The apparatus of claim 18, further comprising:

a protective sleeve extending through the passage and receiving the control line through the protective sleeve.

24. The apparatus of claim 6 wherein the control line gate is generally vertically slidably receivable in the spider door.

25. The apparatus of claim 3 wherein the protective control line sleeve comprises two circumferentially slidable members, one received within the other, and each having an elongated slot that is slidably alienable with the slot of the other member for opening the sleeve.

*26. A method to attach a control line to a tubular member, the method comprising:*

*moving the control line toward the tubular member with a control line arm;*

*attaching the control line to the tubular member;*

*lowering the tubular member with the control line attached thereto through a pipe engaging apparatus;*

*moving the control line away from the tubular member; and*

*engaging the tubular member with the pipe engaging apparatus such that the pipe engaging apparatus supports the tubular member.*

*27. The method of claim 26, further comprising:*

*connecting a second tubular member to the first tubular member;*

*disengaging the pipe engaging apparatus from the first tubular member;*

*moving the control line toward the second tubular member with the control line arm;*

*attaching the control line to the second tubular member;*

*lowering the second tubular member through the pipe engaging apparatus;*

*moving the control line away from the second tubular member; and*

*engaging the second tubular member with the pipe engaging apparatus such that the pipe engaging apparatus supports the second tubular member.*

*28. The method of claim 26, further comprising at least one of:*

*moving the control line arm in a radial direction with respect to an axis of the pipe engaging apparatus; and*

*moving the control line arm in a longitudinal direction with respect to an axis of the pipe engaging apparatus.*

*29. The method of claim 26, wherein the control line arm comprises an actuator coupled thereto, wherein the actuator is used to move the control line toward the tubular member.*

*30. The method of claim 26, wherein the engaging the tubular member with the pipe engaging apparatus comprises:*

*moving a plurality of slip assemblies of the pipe engaging apparatus towards the tubular member such that the plurality of slip assemblies engage the tubular member.*

*31. The method of claim 26, wherein a clamp is used to attach the control line to the tubular member.*

*32. The method of claim 26, wherein the control line arm comprises a guide attached at an end thereof.*

*33. A method to attach a control line to a tubular member, the method comprising:*

*attaching the control line to the tubular member;*

*lowering the tubular member with the control line attached thereto through a pipe engaging apparatus;*

*moving the control line into a control line passage formed within the pipe engaging apparatus;*

*securing the control line within the control line passage with a control line securing mechanism disposed within the control line passage; and*

*engaging the tubular member with the pipe engaging apparatus such that the pipe engaging apparatus supports the tubular member.*

*34. The method of claim 33, wherein the engaging the tubular member with the pipe engaging apparatus comprises:*

*moving a plurality of slip assemblies of the pipe engaging apparatus towards the tubular member such that the plurality of slip assemblies engage the tubular member.*

*35. The method of claim 34, wherein the pipe engaging apparatus comprises a tapered inner surface, wherein moving the plurality of slip assemblies comprises:*

*contacting the tapered inner surface of the pipe engaging apparatus with the plurality of slip assembles.*

*36. The method of claim 35, wherein the pipe engaging apparatus comprises a bowl having the tapered inner surface.*

*37. The method of claim 33, further comprising:*

*connecting a second tubular member to the first tubular member; and*

*supporting the first tubular member and the second tubular member with an elevator.*

*38. The method of claim 37, further comprising:*

*disengaging the pipe engaging apparatus from the first tubular member;*

*releasing the control line from the control line securing mechanism;*

*moving the control line out of the control line passage of the pipe engaging apparatus; and*

*attaching the control line to the second tubular member.*

*39. The method of claim 33, wherein the control line securing mechanism comprises one of a trap, a catch, and a drum.*

*40. The method of claim 33, wherein securing the control line within the control line passage with the control line securing mechanism comprises moving the control line securing mechanism.*

* * * * *